United States Patent
Tokuda

(10) Patent No.: US 12,159,065 B2
(45) Date of Patent: Dec. 3, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Akihiko Tokuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/460,119

(22) Filed: Sep. 1, 2023

(65) Prior Publication Data

US 2023/0409250 A1 Dec. 21, 2023

Related U.S. Application Data

(63) Continuation of application No. 18/056,636, filed on Nov. 17, 2022, now Pat. No. 11,775,229.

(30) Foreign Application Priority Data

Nov. 22, 2021 (JP) .................................. 2021-189524

(51) Int. Cl.
*G06F 3/12* (2006.01)
(52) U.S. Cl.
CPC .......... *G06F 3/1204* (2013.01); *G06F 3/1257* (2013.01); *G06F 3/1286* (2013.01)
(58) Field of Classification Search
CPC ..... G06F 3/1204; G06F 3/1257; G06F 3/1286
USPC ........................................................ 358/1.15
See application file for complete search history.

(56) References Cited

U.S. PATENT DOCUMENTS

| | | | | |
|---|---|---|---|---|
| 7,916,332 | B2* | 3/2011 | Kato | G06F 3/1246 709/201 |
| 9,333,666 | B2* | 5/2016 | Yamawaki | B26F 1/0092 |
| 2008/0225339 | A1* | 9/2008 | Genda | H04N 1/00838 358/1.18 |
| 2009/0219555 | A1* | 9/2009 | Tanaka | G06F 3/1285 358/1.9 |
| 2010/0060909 | A1* | 3/2010 | Conescu | G06Q 10/06 358/1.9 |
| 2013/0016121 | A1* | 1/2013 | Azuchi | G06F 3/1253 345/619 |
| 2015/0156342 | A1* | 6/2015 | Fries | B42D 15/00 358/1.15 |

* cited by examiner

*Primary Examiner* — Allen H Nguyen
(74) *Attorney, Agent, or Firm* — Canon U.S.A., Inc. IP Division

(57) ABSTRACT

An information processing apparatus includes a first setting unit configured to set a layout pattern for a perforation process or a crease process on paper in response to selection by a user, a second setting unit configured to set the number of aggregated pages laid out on a print side of the paper in response to selection by the user, and a control unit configured to perform first processing to avoid selection of a predetermined number of aggregated pages in the second setting unit based on a first layout pattern selected in the first setting unit.

45 Claims, 11 Drawing Sheets

INFORMATION PROCESSING APPARATUS, INFORMATION PROCESSING METHOD, AND STORAGE MEDIUM

This application is a Continuation of U.S. patent application Ser. No. 18/056,636, filed on Nov. 17, 2022, which claims priority from Japanese Patent Application No. 2021-189524, filed on Nov. 22, 2021, which are both hereby incorporated by reference herein in their entireties.

BACKGROUND

Field of the Disclosure

The present disclosure relates to an information processing apparatus, an information processing method, and a storage medium.

Description of the Related Art

In a print system, as a process using a finisher mounted on a printer, there is a perforation process for making fine dashed line cuts on paper on which an image is printed so that the paper is easily torn off. In Japanese Patent Application Laid-Open No. 2015-168235, discussed is a technique of, in a case where saddle-stitch bookbinding (stapling setting process at a center position of paper) is set together with the perforation process in a printer driver, prohibiting designation of a position of a perforation line within a predetermined distance from a location subjected to the stapling setting process.

The perforation process is based on the premise that a printed product is to be torn off. Thus, in a case where a function of performing printing by aggregating a plurality of logical pages into one physical page is set together with the perforation process, there is a case where the printed product is torn off at an incorrect position. For this reason, a user needs to check a relationship between the position of the perforation line and a layout of logical pages by performing test print or the like, which takes a lot of trouble.

SUMMARY

According to an aspect of the present disclosure, an information processing apparatus includes a first setting unit configured to set a layout pattern for a perforation process or a crease process on paper in response to selection by a user, a second setting unit configured to set the number of aggregated pages laid out on a print side of the paper in response to selection by the user, and a control unit configured to perform first processing to avoid selection of a predetermined number of aggregated pages in the second setting unit based on a first layout pattern selected in the first setting unit.

Further features of the present disclosure will become apparent from the following description of exemplary embodiments with reference to the attached drawings.

DESCRIPTION OF THE EMBODIMENTS

Modes for implementing the present disclosure will be described below with reference to the accompanying drawings.

Figure 1:
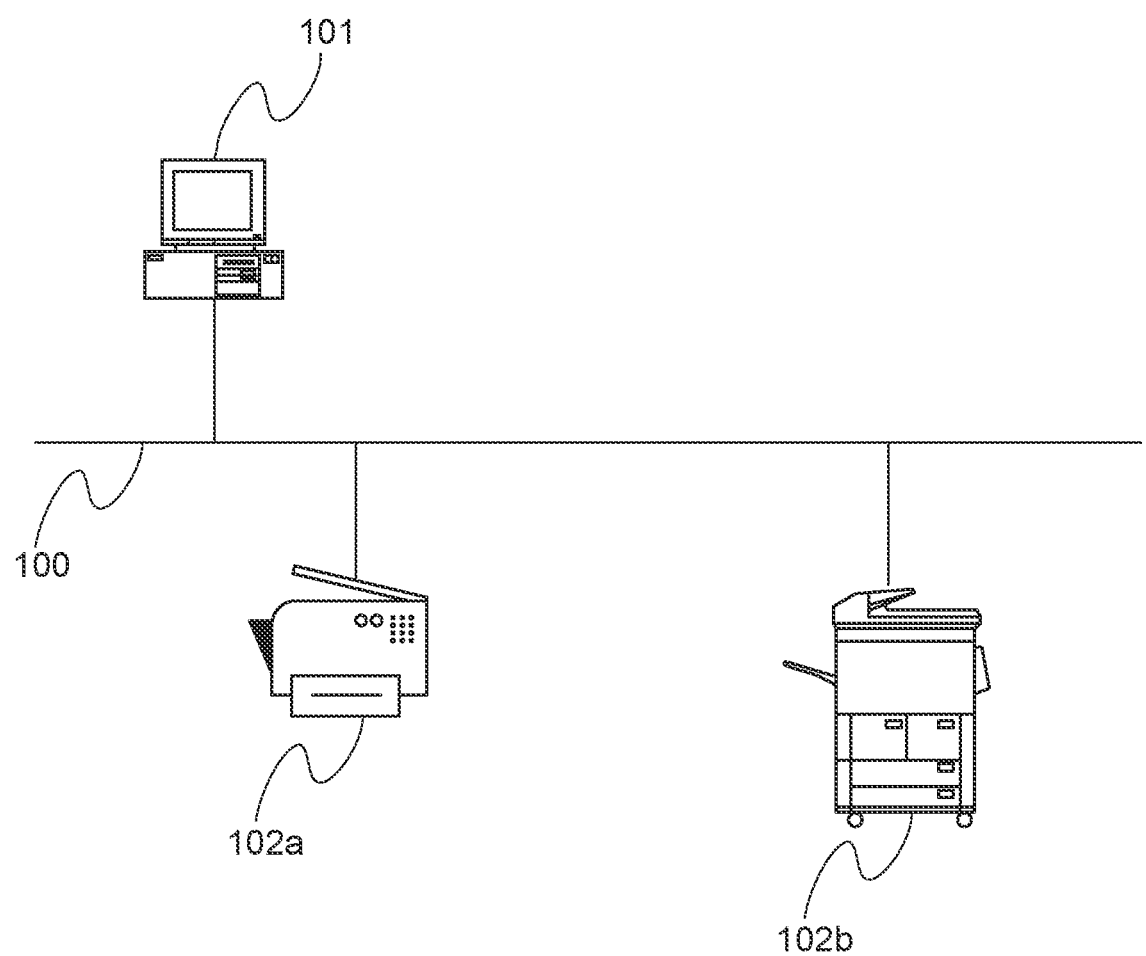
FIG. 1 is a diagram illustrating a configuration example of a print system.

FIG. 1 is a diagram illustrating a configuration example of a print system according to a first exemplary embodiment. As illustrated in FIG. 1, the print system includes a computer 101, and a plurality of print apparatuses, namely, print apparatuses 102a and 102b. The computer 101 is connected to the print apparatuses 102a and 102b via a network 100, which is a wired network or a wireless network. The computer 101 is an example of an information processing apparatus. The print apparatuses 102a and 102 perform print in accordance with an instruction from the computer 101.

In the present exemplary embodiment, the print system includes the print apparatuses 102a and 102b, but may be configured to include one print apparatus. The print apparatuses 102a and 102b can be implemented by similar configurations, and thus are collectively referred to as a print apparatus 102 in the following description.

The print apparatus 102 performs printing by forming an image on paper. The print apparatus 102 is an example of an image forming apparatus. In addition, the print apparatus 102 is provided with a finisher (not illustrated) that performs finishing processing such as a perforation process for perforating paper on which the image is printed and a crease process for creasing the paper on which the image is printed. In the present exemplary embodiment, the print apparatus 102 has a function of perforating the paper only in a direction perpendicular to a conveyance direction of the paper (long sides of the paper in this example).

Figure 2:
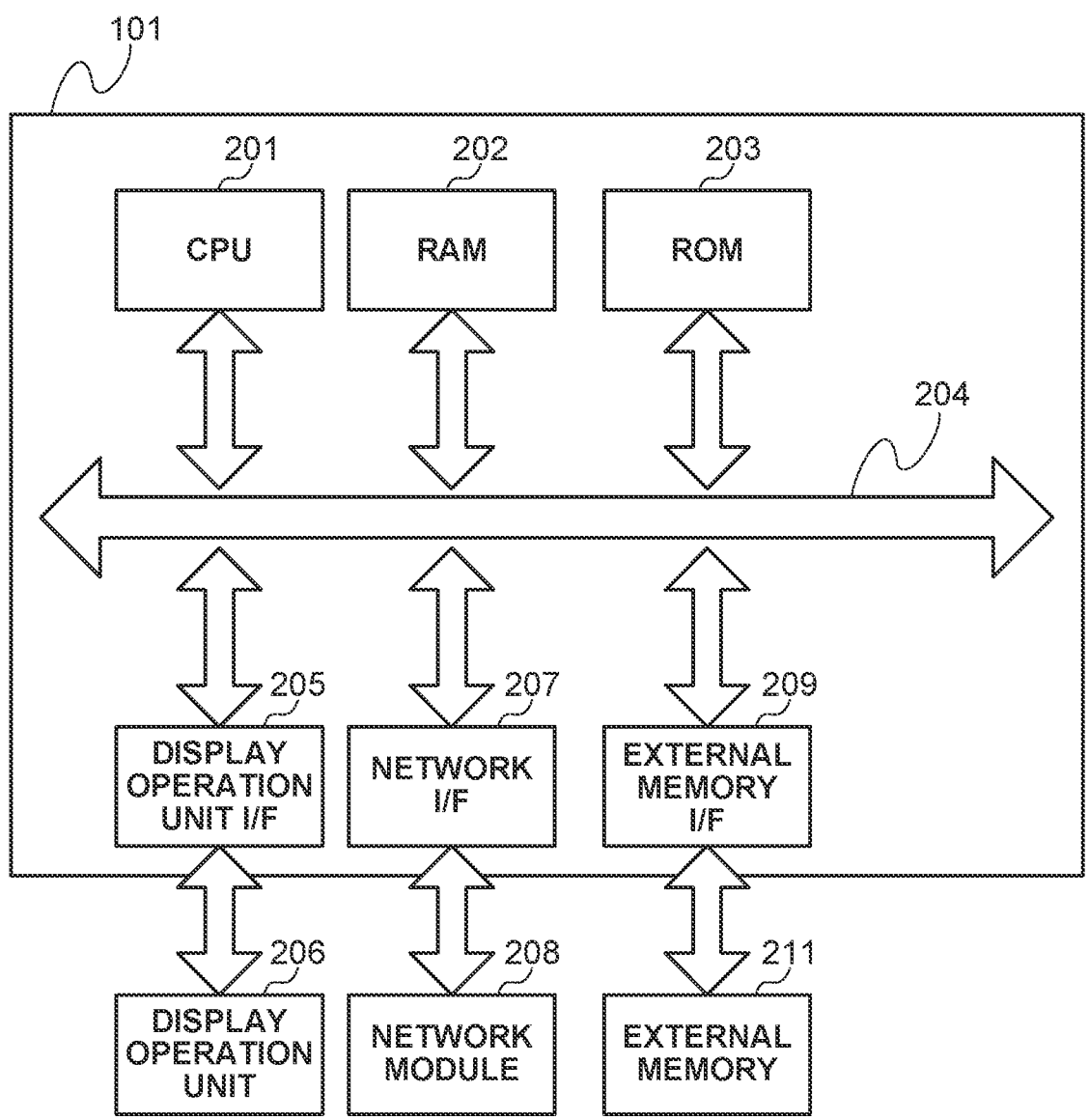
FIG. 2 is a diagram illustrating a hardware configuration of a computer.

FIG. 2 is a diagram illustrating a hardware configuration of the computer 101 according to the present exemplary embodiment. The computer 101 includes a central processing unit (CPU) 201, a random-access memory (RAM) 202, a read-only memory (ROM) 203, a display operation unit interface (I/F) 205, a display operation unit 206, a network I/F 207, a network module 208, an external memory I/F 209, and an external memory 211. These constituent units are connected to each other by a system bus 204.

The CPU 201 controls the whole of the computer 101. The CPU 201 loads a program stored in the ROM 203 or the external memory 211 into the RAM 202 and executes the program, whereby each processing in accordance with the flowchart, which will be described below, is implemented. The RAM 202 functions as a main memory and work area of the CPU 201. The ROM 203 stores various kinds of data.

The display operation unit 206 is connected to the CPU 201 via the display operation unit I/F 205. The display operation unit 206 is, for example, a liquid crystal display equipped with a touch panel, and serves both a function of an operation unit that accepts input from a user and a function of a display unit that displays a result of processing to the user. The operation unit such as a keyboard and a mouse and the display unit such as a liquid crystal display may be separately configured. The network module 208 is connected to the CPU 201 via the network I/F 207. The network module 208 is connected to the network 100. The network I/F 207 communicates with the print apparatus 102 connected to the network 100 under control of the CPU 201. The external memory 211 is connected to the CPU 201 through the external memory I/F 209. The external memory 211 is a storage medium such as a flash memory and a solid state drive (SSD). The external memory I/F 209 accesses the external memory 211 under control of the CPU 201. The external memory 211 stores various kinds of programs including a program for an operating system (OS), programs for various kinds of applications, and a program for a printer driver.

Figure 3:
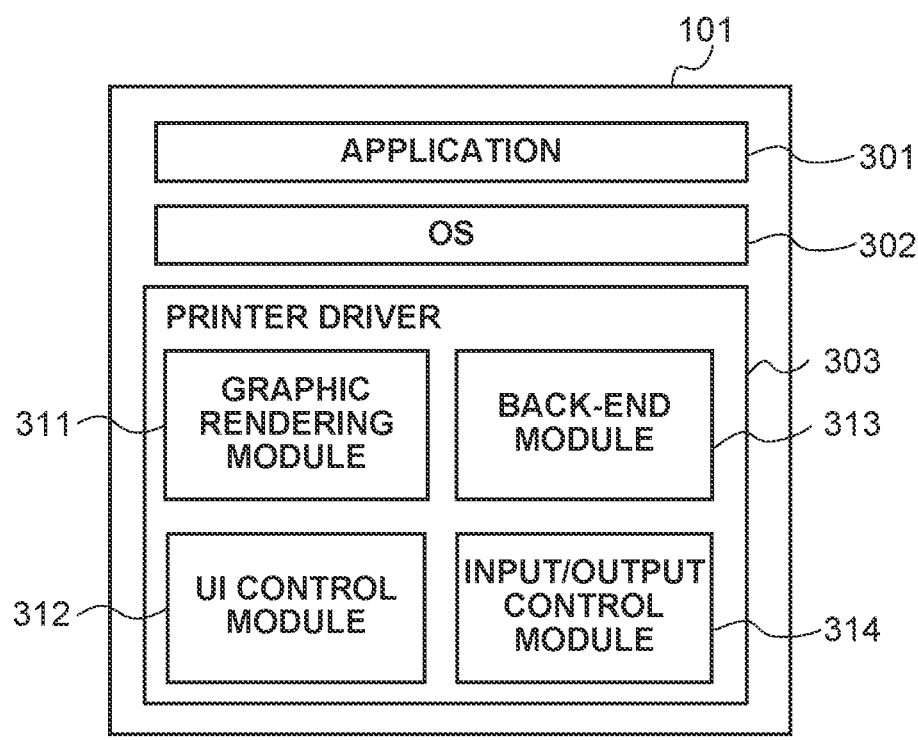
FIG. 3 is a diagram illustrating a software configuration of the computer.

FIG. 3 illustrates a software configuration of the computer 101 according to the present exemplary embodiment. The computer 101 includes, as software modules, an application 301, an OS 302, and a printer driver 303. The CPU 201 executes a program stored in the external memory 211 to implement functions of the software modules illustrated in FIG. 3.

The application 301 has a function of creating document data such as a document and a presentation document and a function of issuing a print instruction. The OS 302 performs basic control of the computer 101. The printer driver 303 converts document data received from the application 301 via the OS 302 into print data that can interpreted in the print apparatus 102 based on print setting information and transmit the print data to the print apparatus 102.

The printer driver 303 includes, as software modules, a graphic rendering (GR) module 311, a user interface (UI) control module 312, a back-end module 313, and an input/output control module 314. The GR module 311 converts the document data provided from the application 301 into a format that can be processed by the print apparatus 102 in accordance with the print setting information provided from the UI control module 312 or the application 301, and generates print data. The UI control module 312 sets items such as a paper size used in print and the number of copies. Specifically, the UI control module 312 sets items regarding layout processing and finishing processing. The layout processing includes N in 1 print in which a plurality of logical pages is laid out in an aggregated manner on one print side. A logical page mentioned herein corresponds to a page of the document data. The finishing processing includes the perforation process. The UI control module 312 displays print setting screens (FIGS. 5 and 6) on the display operation unit 206 to set each item of print based on the user's entry on a corresponding print setting screen, and provides the GR module 311 with printing setting information in which a setting value of each item is stored. The back-end module 313 provides the input/output control module 314 with print data generated by the GR module 311. The input/output control module 314 transmits the print data provided from the back-end module 313 to the print apparatus 102.

Figure 4:
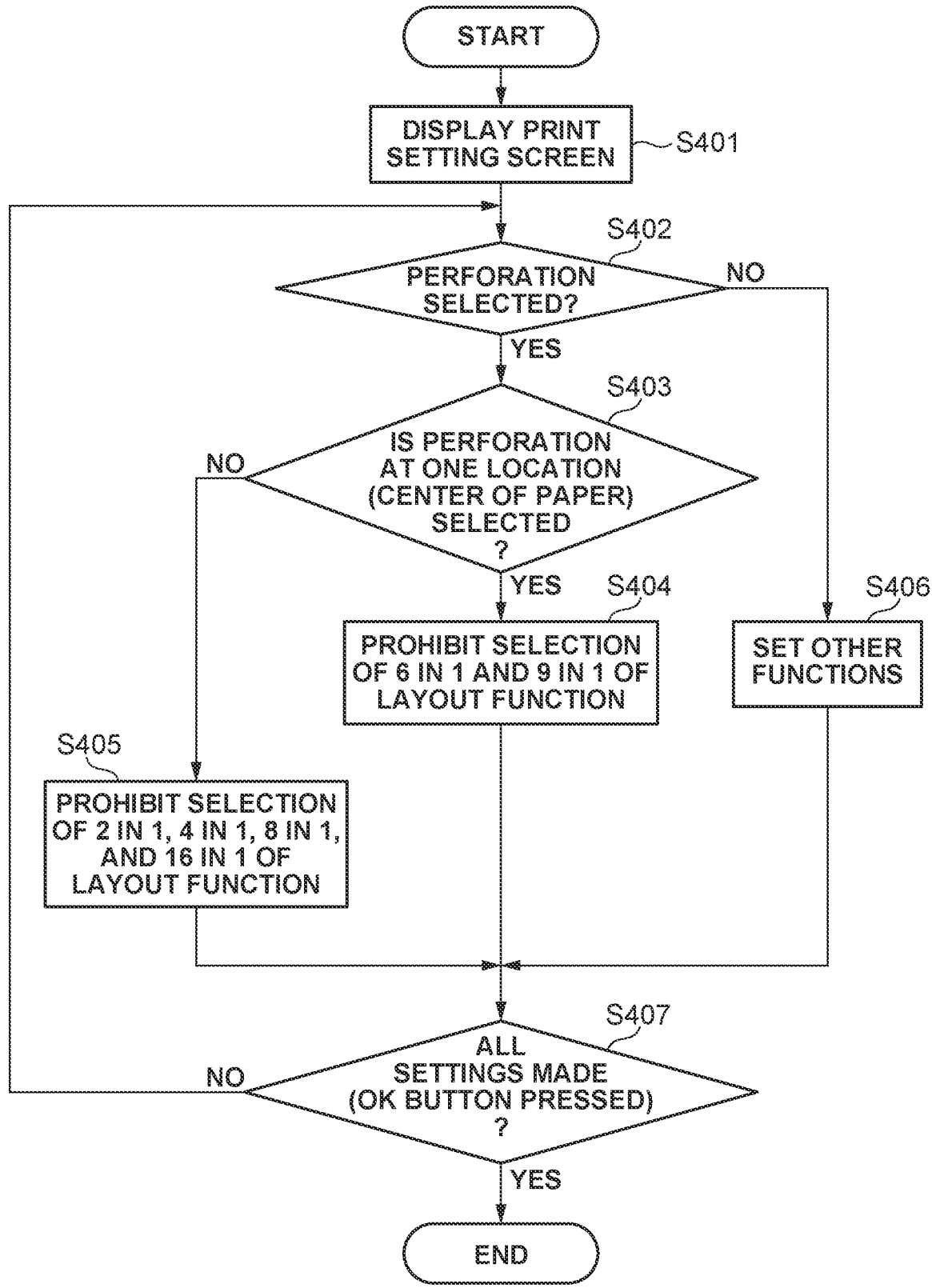
FIG. 4 is a flowchart describing print setting processing according to one or more aspects of the present disclosure.

Next, print setting processing executed in the computer 101 according to the present exemplary embodiment will be described. FIG. 4 is a flowchart describing print setting processing according to the present exemplary embodiment. The flowchart illustrated in FIG. 4 is started, for example, when an instruction for making print settings is made by the user's entry in a state where the document data generated by the application 301 is selected, and the printer driver 303 is started upon reception of the instruction. Each process (step) of the flowchart will be described below by attaching S (step) to the head of a reference number thereof.

Figure 5:
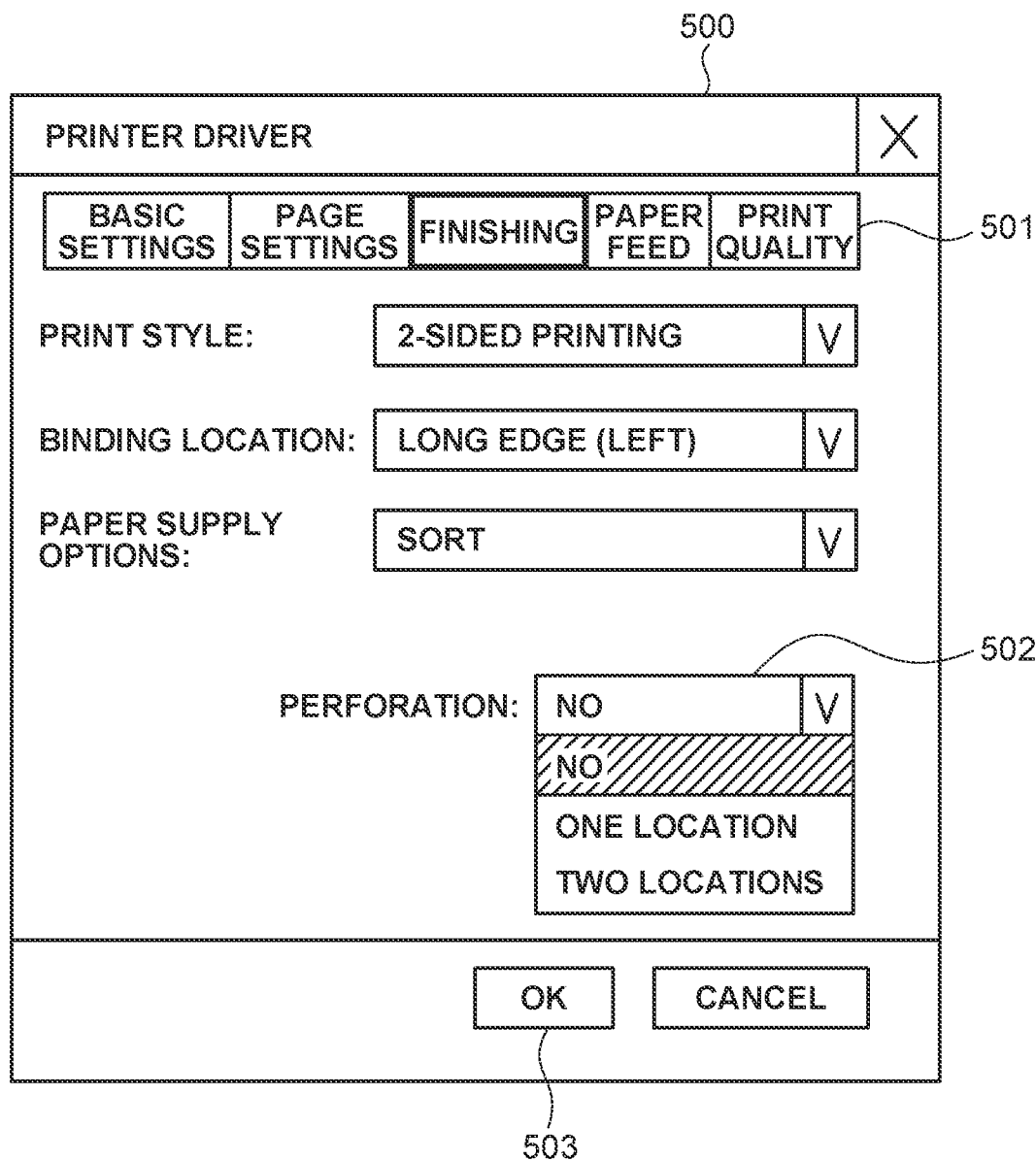
FIG. 5 is a diagram illustrating a display example of a print setting screen.

In step S401, when the printer driver 303 is started, the CPU 201 displays a print setting screen of the printer driver 303 on the display operation unit 206. FIG. 5 is a diagram illustrating an example of a print setting screen. An item tab 501 is arranged on a print setting screen 500 in FIG. 5. The item tab 501 is provided with setting items such basic settings, page settings, finishing, paper feed, and print quality. FIG. 5 illustrates a state where finishing is selected in the item tab 501. A perforation process selection section 502 for selecting a setting value of an item of the perforation process is arranged on the print setting screen 500 in FIG. 5. In the present exemplary embodiment, "no", "one location", and "two locations" are displayed to be selectable as a list. The CPU 201 sets whether to designate the perforation process and the number of perforation lines based on the user's selection operation in the perforation process selection section 502. When the user presses an OK button 503, the CPU 201 reflects a content set in each item of the print setting screen 500 on the print setting information.

In the present exemplary embodiment, in a case where the "one location" is selected as the number of perforation lines, a pattern in which one perforation line is laid out at the center position of long sides of paper is set. In a case where the "two locations" is selected as the number of perforation lines, a pattern in which two perforation lines are laid out at positions that equally divide the long sides of the paper into three is set.

Figure 6:
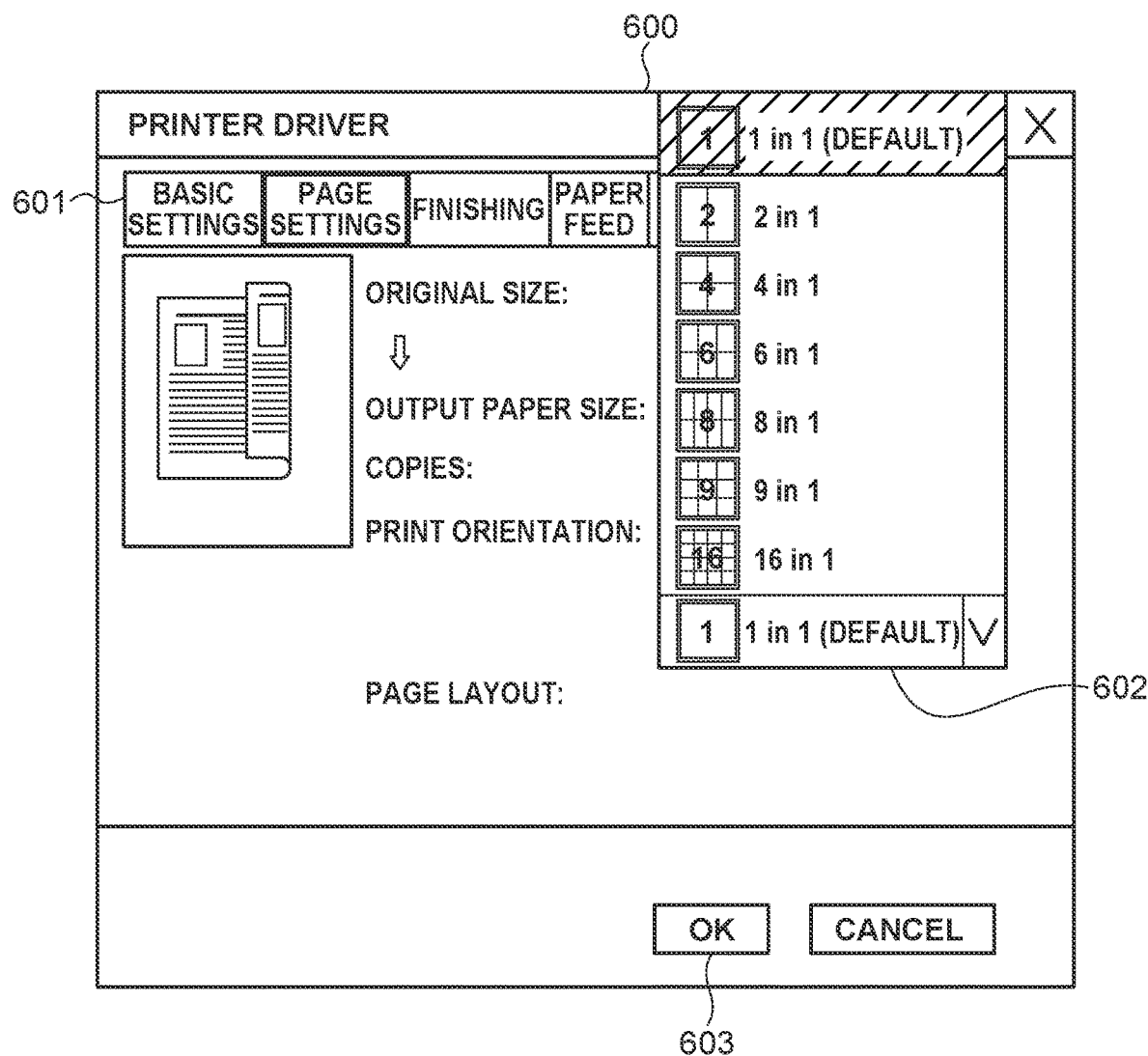
FIG. 6 is a diagram illustrating a display example of a print setting screen.

When the item of the page settings is selected in the item tab 501 on the print setting screen 500 in FIG. 5, the screen transitions to a state illustrated in FIG. 6. FIG. 6 is a diagram illustrating an example of a print setting screen according to the present exemplary embodiment. FIG. 6 illustrates a state where the item of the page settings is selected in an item tab 601 on a print setting screen 600. A page layout selection section 602 for selecting a setting value of an item of N in 1 print is arranged on the print setting screen 600 in FIG. 6. With an operation of a pull-down button in the page layout selection section 602, 1 in 1, 2 in 1, 4 in 1, 6 in 1, 8 in 1, 9 in 1, and 16 in 1 are displayed to be selectable as a list. The N in 1 is a layout in which N logical pages are laid out on one print side. A layout configuration when the N logical pages are laid out on one print side are fixed. N mentioned herein represents, in a case of being two or more, the number of pages when logical pages are aggregated on one print side (hereinafter referred to as the number of aggregated pages). The CPU 201 sets whether to perform page aggregation print and the number of aggregated pages based on the user's selection operation in the page layout selection section 602. When the user presses an OK button 603, the CPU 201 reflects a content set in each item of the print setting screen 600 on the print setting information.

Subsequently, in step S402, the CPU 201, upon acceptance of the user's entry, determines whether the perforation process is designated on the print setting screen of the printer driver 303. In a case where the "one location" or the "two locations" is selected in the perforation process selection section 502 in FIG. 5 (YES in step S402), the CPU 201 determines that the perforation process is designated. In a case where the CPU 201 determines that the perforation process is designated, the processing proceeds to step S403. Otherwise, the processing proceeds to step S406.

In step S403, the CPU 201 determines whether the "one location" (the pattern in which a perforation line is laid out at the center position of the long sides of the paper) is selected or the "two locations" (the pattern in which perforation lines are laid out at the positions that equally divide the long sides of the paper into three) is selected in the perforation process selection section 502. In a case where the CPU 201 determines that the "one location" is selected (YES in step S403), the processing proceeds to step S404. In a case where the CPU 201 determines that the "two location" is selected (NO in step S403), the processing proceeds to step S405.

FIG. 7A to 7E are diagrams each schematically illustrating the print side subjected to the perforation process. A position of a thick dotted line inside the print side illustrated in each of FIGS. 7A to 7F indicates a position of a perforation line, and numbers in the print side indicate the layout order of logical pages.

Figure 7A:
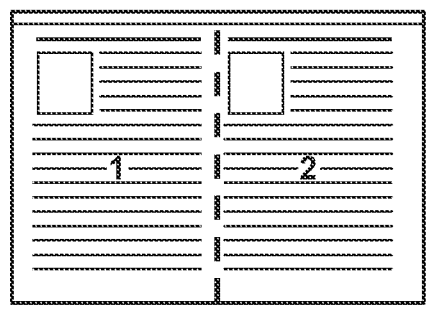
FIGS. 7A to 7F are diagrams each schematically illustrating a printed product subjected to a perforation process.
Figure 7B:
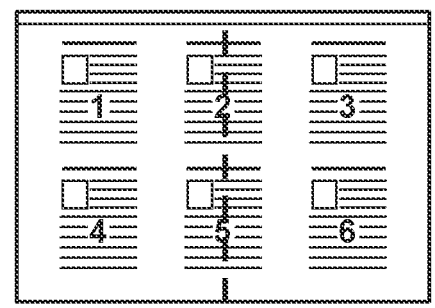
Figure 7C:
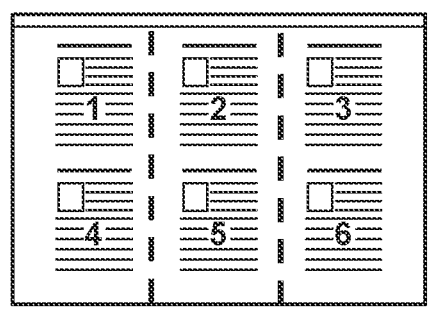
Figure 7D:
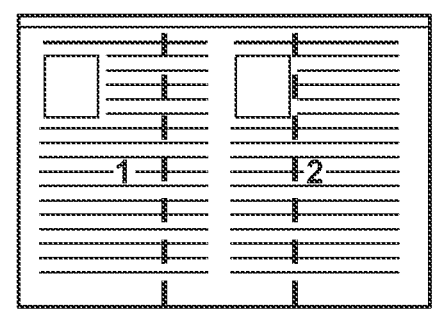
Figure 7E:
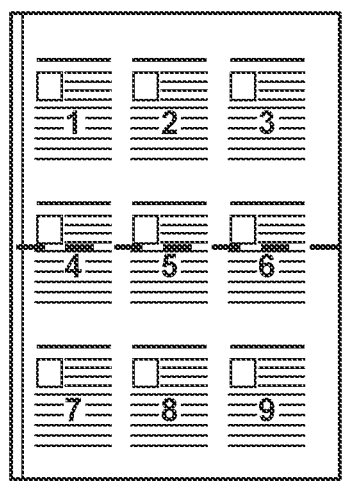

FIGS. 7A, 7B, and 7E each illustrate a case where the "one location" is selected in the perforation process selection section 502. As illustrated in FIG. 7A, in a case of a combination of perforation in one location and the 2 in 1 print, a position of a perforation line matches a boundary between the first page and second page of the logical pages. In contrast, as illustrated in FIG. 7B, in a case of a combination of perforation in one location and the 6 in 1 print, the position of the perforation line overlaps the second and fifth pages of the logical pages. As illustrated in FIG. 7E, also in a case of a combination of perforation in one location and the 9 in 1 print, the position of the perforation line overlaps the fourth to sixth pages of the logical pages.

To address this, in step S404, the CPU 201 performs prohibition processing (first processing) to avoid selection of predetermined numbers of aggregated pages in the page layout selection section 602. In the present exemplary embodiment, the CPU 201 performs gray-out display so that 6 in 1 and 9 in 1 cannot be selected in the page layout selection section 602, in response to selection of the "one location" in the perforation process selection section 502. As another example of the prohibition processing, 6 in 1 and 9 in 1 may be excluded from options. Alternatively, in a case where 6 in 1 or 9 in 1 is selected, the CPU 201 may display, on the display operation unit 206, a warning message indicating that an inappropriate layout is selected or output warning sound from an audio output unit (not illustrated) to issue a warning. Still alternatively, the CPU 201 may mask the OK button 603 on the print setting screen 600 to perform control to prevent generation of print data. Still alternatively, the CPU 201 may perform control to change the number to another number of aggregated pages such as 4 in 1 and 8 in 1. As described above, the CPU 201 performs control to avoid selection of a combination of the pattern in which the perforation line is laid out at the center of the long sides of paper and 6 in 1 or 9 in 1 page aggregation print. Thereafter, the processing proceeds to step S407.

Figure 7F:
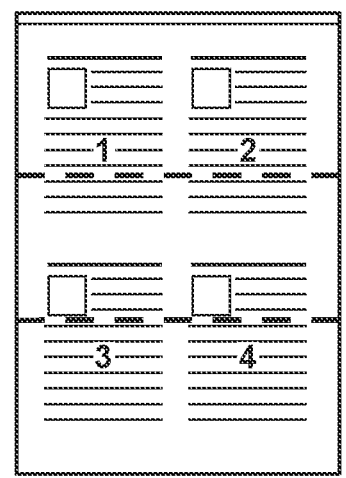

FIGS. 7C, 7D, and 7E each illustrate a case where the "two locations" is selected in the perforation process selection section 502. As illustrated in FIG. 7C, in a case of a combination of perforation in two locations and the 6 in 1 print, positions of perforation lines match respective boundaries between the logical pages. In contrast, as illustrated in FIG. 7D, in a case of a combination of perforation in two locations and the 2 in 1 print, the positions of perforation lines overlap the logical pages. As illustrated in FIG. 7F, also in a case of a combination of perforation in two locations and the 4 in 1 print, the positions of perforation lines overlap the logical pages. Although not illustrated, also in a case of a combination of perforation in two locations and the 8 in 1 print or a combination of two locations and the 16 in 1 print, the positions of perforation lines overlap the logical pages.

To address this, in step S405, the CPU 201 performs the prohibition processing (first processing) to avoid selection of the predetermined numbers of aggregated pages in the page layout selection section 602. In the present exemplary embodiment, the CPU 201 performs gray-out display so as to prevent the user from selecting 2 in 1, 4 in 1, 8 in 1, and 16 in 1 in the page layout selection section 602, in response to selection of the "two locations" in the perforation process selection section 502. Other examples of the prohibition processing are similar to those in step S404, and thus a description thereof is omitted. As described above, the CPU 201 performs control to avoid selection of a combination of the pattern in which the perforation lines are laid out at positions that equally divide the long sides of paper into three and 2 in 1, 4 in 1, 8 in 1, or 16 in 1. Thereafter, the processing proceeds to step S407.

As described above in steps S403 to S405, the CPU 201 executes appropriate prohibition processing in the page layout selection section 602 based on the number of perforation lines selected in the perforation process selection section 502. Thus, in step S403, the CPU 201 compares a position of each perforation line on the print side and positions of logical pages laid out on the print side, and determines if the position of the perforation line overlaps the logical pages. As a result, the CPU 201 decides to target at the number of aggregated pages determined to overlap the position of the perforation line for the prohibition processing, and decides not to target at the number of aggregated pages determined not to overlap the position of the perforation line for the prohibition processing.

The processing described in steps S403 to S405 is an example in a case where the layout patterns selectable in the perforation process selection section 502 are fixed to the "one location" or the "two locations". In a case where another layout pattern is selectable in the perforation process selection section 502, the CPU 201 changes the number of aggregated pages serving as the target of the prohibition processing as appropriate depending on the other layout pattern.

As another method, the external memory 211 may retain, as prohibition information, numbers of aggregated pages that are prohibited from being selected in combination with the number of perforation lines selectable in the perforation process selection section 502. The numbers of aggregated pages and the number of perforation lines are retained in association with each other. In this case, the CPU 201 reads out the prohibition information from the external memory 211, and targets at the numbers of aggregated pages in association with the number of perforation lines selected in the perforation process selection section 502 for the prohibition processing.

In step S406, the CPU 201 sets each item for print as necessary based on the user's entry to the print setting screen of the printer driver 303.

In step S407, the CPU 201 determines if the OK button on the print setting screen (the OK button 503 in FIG. 5 or the OK button 603 in FIG. 6) is pressed. In a case where the CPU 201 determines that the OK button is pressed (YES in step S407), the CPU 201 closes the print setting screen and starts processing of generating print data based on the print setting information on which a content set in each item of the print setting screen is reflected.

Thereafter, a series of processing in the flowchart ends. In a case where the CPU 201 determines that the OK button is not pressed (NO in step S407), the processing returns to step S402. In step S402, the CPU 201 waits for the user's entry again.

In a case where the page aggregation print is performed together with the perforation process, the first exemplary embodiment described above can prevent output of a deliverable on which pages are printed at incorrect positions when being torn off.

In the above-mentioned flowchart in FIG. 4, the CPU 201 performs the prohibition processing so as to avoid selection of the predetermined numbers of aggregated pages in the page layout selection section 602 based on the number of perforation lines selected in the perforation process selection section 502. Conversely, the CPU 201 may perform the prohibition processing so as to avoid selection of a predetermined number of perforation lines in the perforation process selection section 502 based on the number of aggregated pages selected in the page layout selection section 602. For example, in response to selection of 6 in 1 or 9 in 1 in the page layout selection section 602, the CPU 201 excludes the "one location" from the options in the perforation process selection section 502. Alternatively, the CPU 201 may perform the prohibition processing so as to avoid selection of the predetermined number of perforation lines in the perforation process selection section 502 based on the number of aggregated pages selected on a print layout screen (not illustrated) of the application 301.

While the perforation layout pattern is fixed to the "one location" or the "two locations" in the print system according to the above-mentioned first exemplary embodiment, there is also a case where the print system has a function of making position(s) of perforation line(s) variable (for example, units of 1 mm). In a case where the above-mentioned function is enabled, the position(s) of perforation line(s) can be freely set, whereby general versatility of the perforation process increases. Nevertheless, the function has low compatibility with the layout processing of laying out the logical pages at fixed positions on the print side like the present exemplary embodiment. To address this, in a case where the function of making the position(s) of perforation line(s) variable is enabled, the CPU 201 may perform control so as to disable selection of options other than 1 in 1 in the page layout selection section 602.

Next, a second exemplary embodiment will be described. In the following description of the second exemplary embodiment, matters common to the above-mentioned first exemplary embodiment will not be described and matters different from the above-mentioned exemplary embodiment will mainly be described.

A configuration of a print system according to the second exemplary embodiment is similar to the print system according to the first exemplary embodiment illustrated in FIG. 1A to FIG. 3. In the above-mentioned first exemplary embodiment, the description has been given of the method of performing the prohibition processing so as to avoid selection of the predetermined numbers of aggregated pages in the page layout selection section 602 in FIG. 6 based on the number of perforation lines selected in the perforation process selection section 502 in FIG. 5. In contrast, a method of performing prohibition processing also with respect to the layout order of laying out the logical pages on one print side will be described in the second exemplary embodiment.

Figure 8:
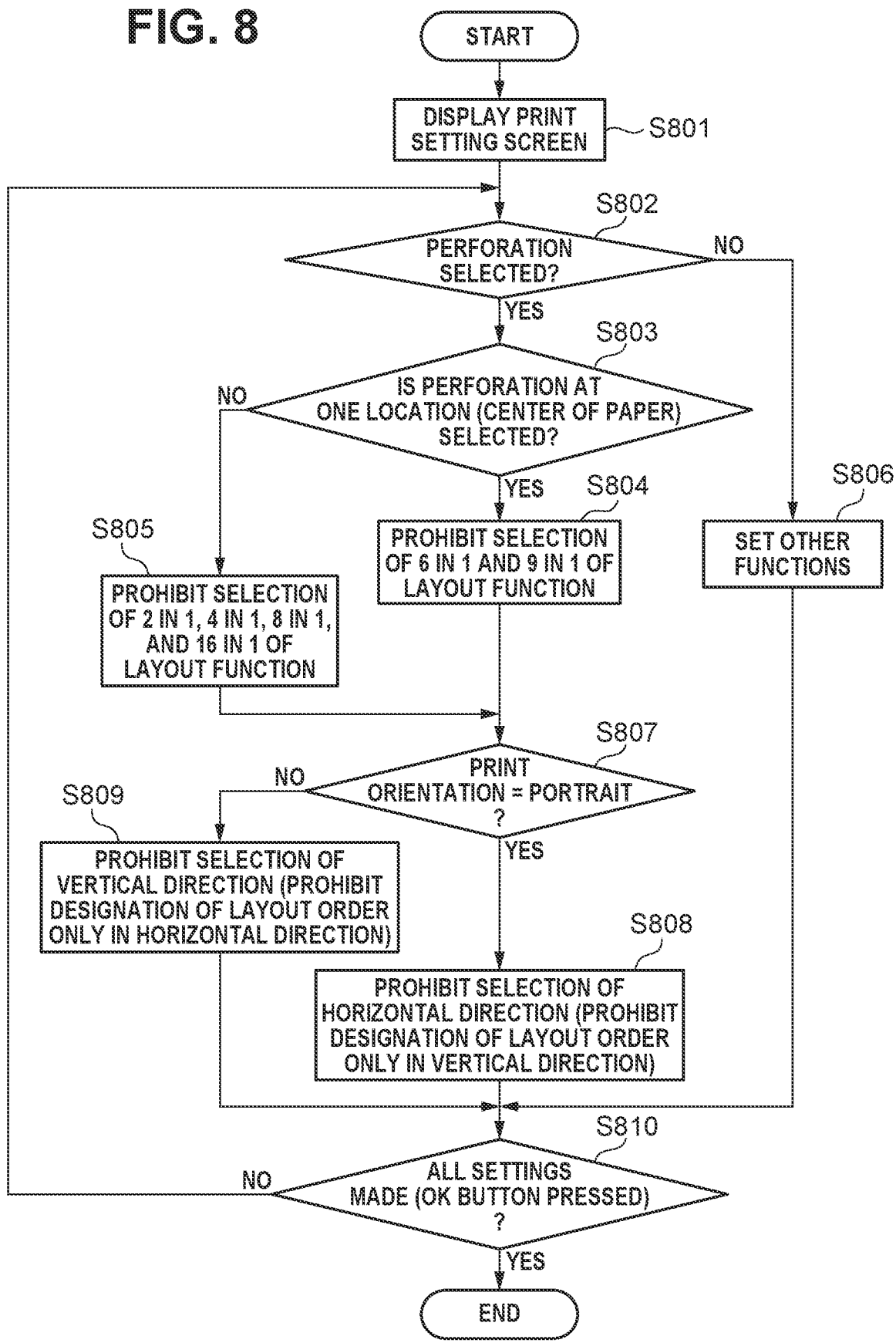
FIG. 8 is a flowchart describing print setting processing according to one or more aspects of the present disclosure.
Figure 9:
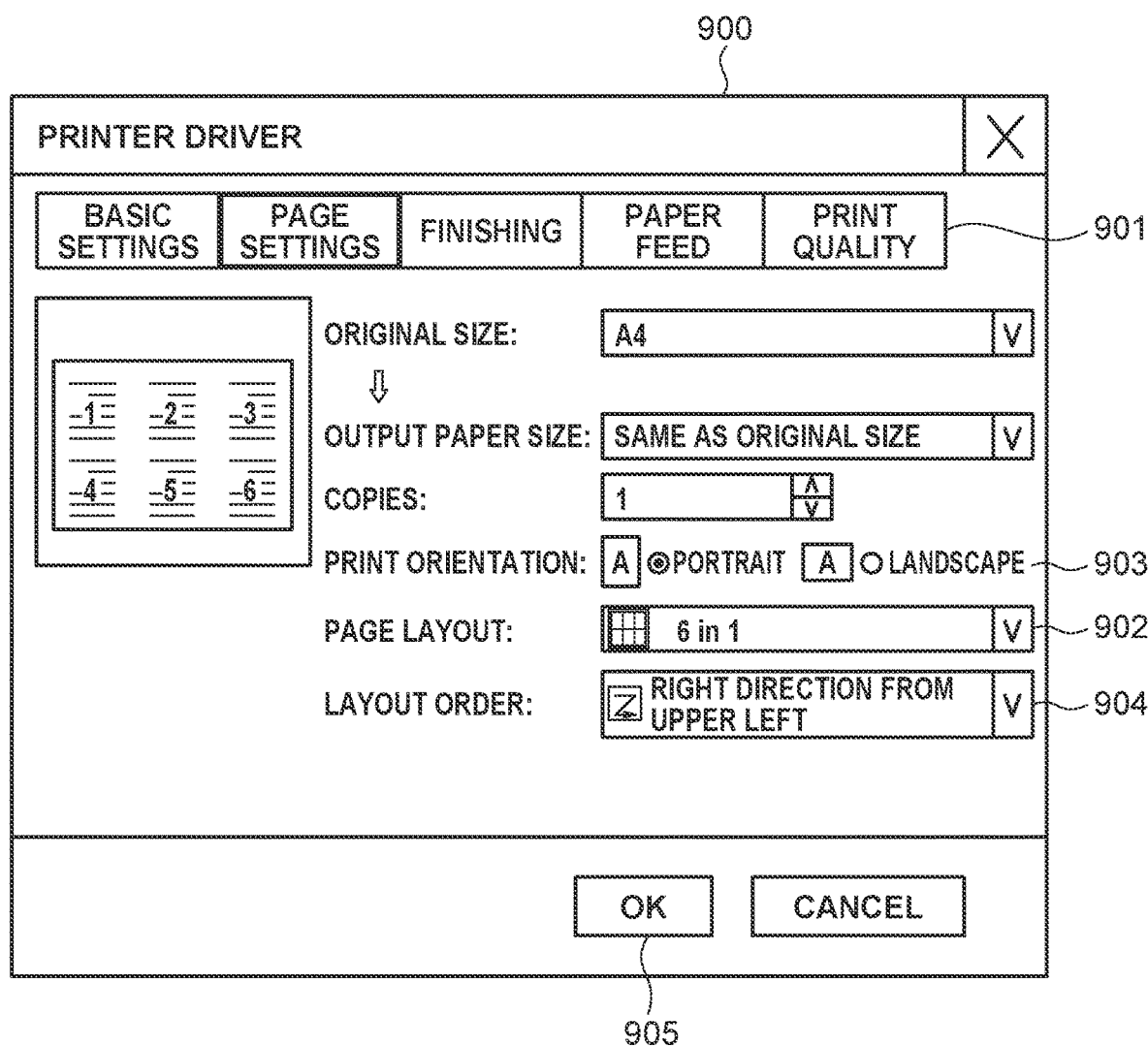
FIG. 9 is a diagram illustrating a display example of a print setting screen.

FIG. 8 is a flowchart describing print setting processing according to the present exemplary embodiment. Since steps S801 to S806 in FIG. 8 are similar to steps S401 to S406 in FIG. 4, respectively, a description thereof is omitted. The print setting screen 500 similar to that illustrated in FIG. 5 is also displayed in the present exemplary embodiment. However, when the item of the page settings is selected in the item tab 501, a print setting screen illustrated in FIG. 9 is displayed instead of the print setting screen 600 illustrated in FIG. 6. FIG. 9 is a diagram illustrating an example of the print setting screen according to the present exemplary embodiment. A page layout selection section 902 illustrated in FIG. 9 is similar to the page layout selection section 602 illustrated in FIG. 6. On a print setting screen 900 illustrated in FIG. 9, arranged are a print orientation selection section 903 for selecting a setting value of the orientation of the logical pages printed on the print side (print orientation) and a layout order selection section 904 for selecting a setting value of the layout order for laying out the logical pages on the print side (page layout order). In the print orientation selection section 903, either landscape or portrait is selectable as the print orientation. In the layout order selection section 904, any one of a right direction from the upper left, a downward direction from the upper left, a left direction from the upper right, and a downward direction from the upper right is selectable. FIG. 9 illustrates a state where the 6 in 1 print is selected in the page layout selection section 902, the portrait is selected in the print orientation selection section 903, and the right direction from the upper left is selected in the layout order selection section 904. A layout configuration in a case where the selection is made in this manner is displayed on the left side of the print setting screen 900. The CPU 201 sets the print orientation and the page layout order based on the user's selection operation in the print orientation selection section 903 and the layout order selection section 904. When the user presses an OK button 905, the CPU 201 reflects a content set in each item of the print setting screen 900 on the print setting information.

In step S807, the CPU 201 determines whether the portrait is selected or the landscape is selected in the print orientation selection section 903. In a case where the CPU 201 determines that the portrait is selected (YES in step S807), the processing proceeds to step S808. In a case where the CPU 201 determines that the landscape is selected (NO in step S807), the processing proceeds to step S809.

FIG. 10 is a diagram schematically illustrating a print side subjected to the perforation process. A position of a thick dotted line inside the print side in each of FIGS. 10A to 10F indicates a position of a perforation line, and numbers in the print side indicate the page layout order.

The description will be given using an example in a case where the "two locations" is selected in the perforation process selection section 502 and the 6 in 1 print is selected in the page layout selection section 902.

Figure 10A:
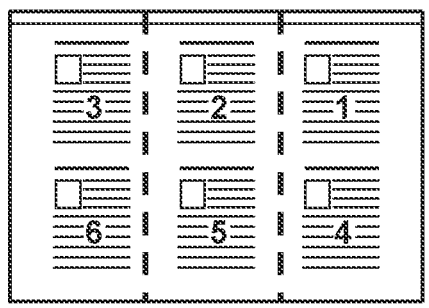
FIGS. 10A to 10F are diagrams each schematically illustrating a printed product subjected to the perforation process.
Figure 10B:
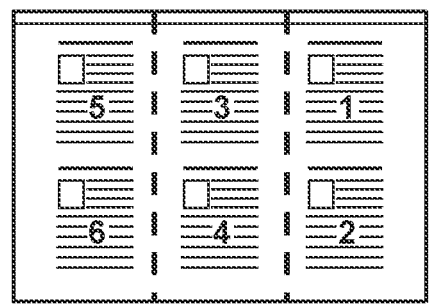
Figure 10C:
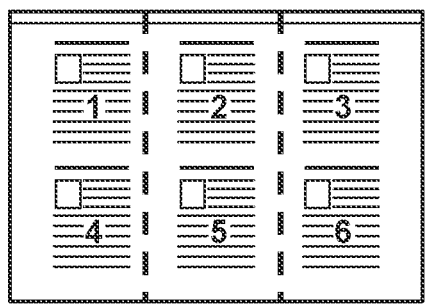
Figure 10D:
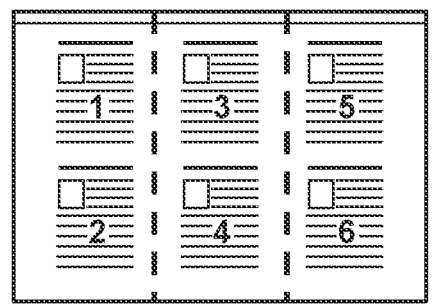

In FIGS. 10A to 10D, the portrait is selected in the print orientation selection section 903. In a case where the print orientation is the portrait in the 6 in 1 print, a layout is configured so that the logical pages in two rows and three columns are laid out on the print side arranged in a landscape manner. FIG. 10A illustrates a case where the left direction from the upper right (so-called Z-direction) is selected in the layout order selection section 904. FIG. 10B illustrates a case where the downward direction from the upper right (so-called N-direction) is selected in the layout order selection section 904. FIG. 10C illustrates a case where the right direction from the upper left (so-called Z-direction) is selected in the layout order selection section 904. FIG. 10D illustrates a case where the downward direction from the upper left (so-called N-direction) is selected in the layout order selection section 904.

Figure 10E:
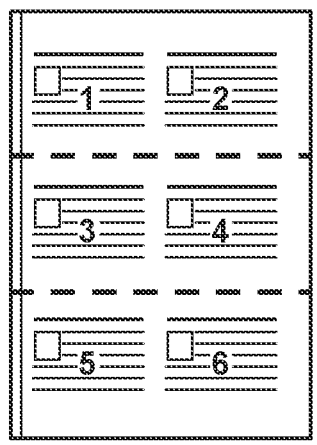
Figure 10F:
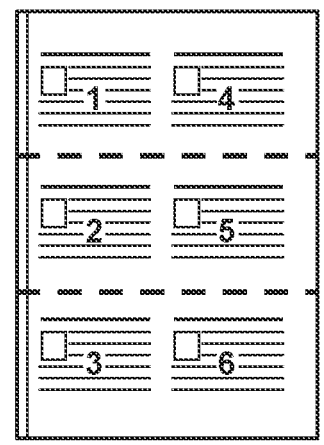

In FIGS. 10E to 10F, the landscape is selected in the print orientation selection section 903. In a case where the print orientation is the landscape in the 6 in 1 print, a layout is configured so that the logical pages in three rows and two columns are laid out on the print side arranged in a portrait manner. FIG. 10E illustrates a case where the right direction from the upper left (so-called Z-direction) is selected in the layout order selection section 904. FIG. 10F illustrates a case where the downward direction from the upper left (so-called N-direction) is selected in the layout order selection section 904.

Taking a close look at FIGS. 10A to 10F, document data is sectioned by a perforation line for every two pages. In FIGS. 10A, 10C, and 10F, the first page and the fourth page (subsequently, the second page and the fifth page, and the third page and the sixth page) are included in a single region sectioned by the perforation line. In a case where discontinuous pages are included in the single region section by the perforation line in this manner, pages included in a single piece of paper become discontinuous when torn off at the perforation line, and thus an output product in this case is not desirable as a deliverable. In FIGS. 10B, 10D, and 10E, on the other hand, since pages that are continuous when torn off at the perforation line are included in the single piece of paper, an output product in this case is a natural output product.

In step S808, in a case where the portrait is selected in the print orientation selection section 903, the CPU 201 performs prohibition processing (second processing) to avoid selection of the layout orders in the horizontal direction (the Z-direction) in the layout order selection section 904. In the present exemplary embodiment, the CPU 201 performs gray-out display so as to prevent the user from selecting the layout orders in the horizontal direction in the layout order selection section 904, in response to selection of the portrait in the print orientation selection section 903. As another example of the prohibition processing, the layout orders in the horizontal direction may be excluded from options. In a case where any layout order in the horizontal direction is selected, the CPU 201 may display, on the display operation unit 206, a warning message indicating that an inappropriate layout is selected or output warning sound from the audio output unit (not illustrated) to issue a warning. Alternatively, the CPU 201 may mask the OK button 905 on the print setting screen 900 to perform control to prevent generation of print data.

Still alternatively, the CPU 201 may perform control to change the layout order to any layout order in a vertical direction. As described above, in a case where a combination of the pattern in which the perforation lines are laid out at the positions that equally divide the long sides of paper into three, the 6 in 1 print, and the portrait as the print orientation is selected, the CPU 201 performs control to avoid selection of the layout orders in the horizontal direction. Thereafter, the processing proceeds to step S810 which is similar to step S407.

In step S809, in a case where the landscape is selected in the print orientation selection section 903, the CPU 201 performs the prohibition processing (second processing) to avoid selection of the layout orders in the vertical direction (so-called N-direction) in the layout order selection section 904. In the present exemplary embodiment, the CPU 201 performs gray-out display so as to prevent the user from selecting the layout orders in the vertical direction in the layout order selection section 904, in response to selection of the landscape in the print orientation selection section 903. Other examples of the prohibition processing are similar to those in step S808, and thus a description thereof is omitted. As described above, in a case where a combination of the pattern in which the perforation lines are arranged at positions that equally divide the long sides of paper into three, the 6 in 1 print, and the landscape as the print orientation is selected, the CPU 201 performs control to avoid selection of the layout orders in the vertical direction. Thereafter, the processing proceeds to step S810 which is similar to step S407.

As described above in steps S807 to S809, the CPU 201 executes appropriate prohibition processing in the layout order selection section 904 based on a combination of respective setting values selected in the perforation process selection section 502, the page layout selection section 902, and the print orientation selection section 903. Thus, in step S807, the CPU 201 determines whether the order of logical pages laid out in the single region sectioned by the perforation line(s) is discontinuous with respect to each of the layout orders in the horizontal direction and the layout orders in the vertical direction. As a result, the CPU 201 decides to target at a layout order determined to be discontinuous for the prohibition processing, and decides not to target at a layout order determined not to be discontinuous for the prohibition processing.

As another example, the external memory 211 may retain, as prohibition information, page layout orders that are prohibited from being selected in combination with combinations of respective setting values selectable in the perforation process selection section 502, the page layout selection section 902, and the print orientation selection section 903. The page layout orders are retained in association with the combinations of the respective setting values. In this case, the CPU 201 reads out the prohibition information from the external memory 211, and targets at the page layout orders associated with contents selected in the perforation process selection section 502, the page layout selection section 902, and the print orientation selection section 903 for the prohibition processing.

Processing indicated in steps S807 to S809 is an example in a case where the "two locations" is selected in the perforation process selection section 502 and the 6 in 1 print is selected in the page layout selection section 902. Thus, the CPU 201 appropriately changes whether to target at the layout orders in the vertical direction or the layout orders in the horizontal direction for the prohibition processing in response to selection in the print orientation selection section 903 based on a combination of respective setting values selected in the perforation process selection section 502 and the page layout selection section 902.

In a case where the direction of perforation is limited to the direction that is perpendicular to the long sides of paper like the present exemplary embodiment, the following rules are assumed. For example, if the portrait is selected as the print orientation, there is a case where the print side is arranged in the landscape manner and the logical pages are laid out in two stages, one upper stage and one lower stage, depending on the number of aggregated pages selected in the page layout selection section 902 like the 6 in 1 print and the 8 in 1 print. In such a case, if the logical pages are sequentially laid out in the horizontal direction, each perforation line is laid out between continuous logical pages. Thus, in a case where a layout in which the logical pages are laid out on the print side arranged in the landscape manner is selected in the page layout selection section 902, the CPU 201 performs the prohibition processing so as to avoid selection of the layout orders in the horizontal direction in the print orientation selection section 903.

In a case of the 6 in 1 print and the 8 in 1 print, if the landscape is selected as the print orientation, the CPU 201 lays out the logical pages in two left and right columns on the print side arranged in the portrait manner. In such a case, if the logical pages are sequentially laid out in the vertical direction, each perforation line is laid out between continuous logical pages. Thus, in a case where a layout in which the logical pages are laid out on the print side arranged in the portrait manner is selected in the page layout selection section 902, the CPU 201 performs the prohibition processing so as to avoid selection of the layout orders in the vertical direction in the print orientation selection section 903.

In a case where the page aggregation print is performed together with the perforation process, the second exemplary embodiment described above can prevent output of a piece of paper including pages that are discontinuous when torn off.

While the description has been given of the case where the direction of perforation is only the direction that is perpendicular to the long sides of paper in the above-mentioned exemplary embodiments, the following description will be given of a case where the direction of perforation can be two directions, which are a direction that is parallel to the long sides of paper and the direction that is perpendicular to the long sides of paper. A combination of a perforation layout pattern and the number of aggregated pages serving as a target of the prohibition processing in such a case will be described using examples.

FIGS. 11A to 11F are diagrams each schematically illustrating a print side subjected to the perforation process. A position of a thick dotted line inside the print side in each of FIGS. 11A to 11F indicates a position of a perforation line, and numbers in the print side indicate the page layout order.

Figure 11A:
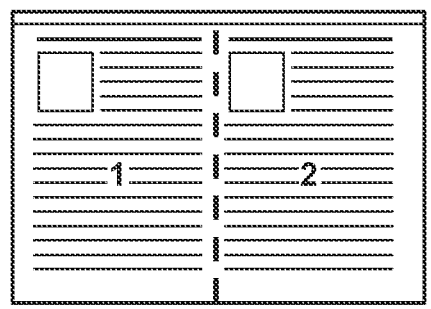
FIGS. 11A to 11F are diagrams each schematically illustrating a printed product subjected to the perforation process.
Figure 11B:
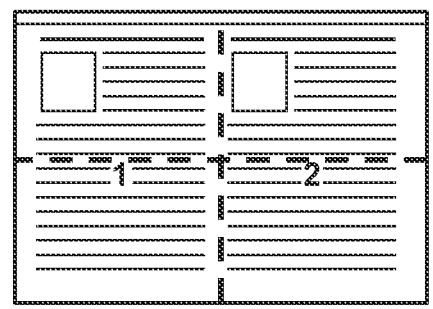
Figure 11C:
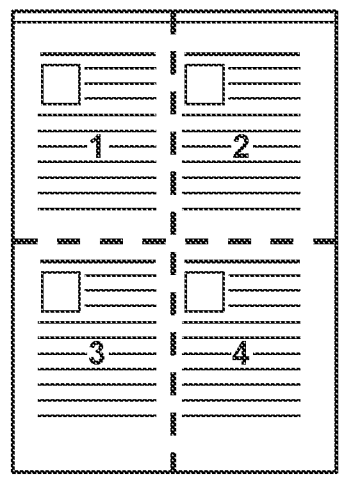
Figure 11D:
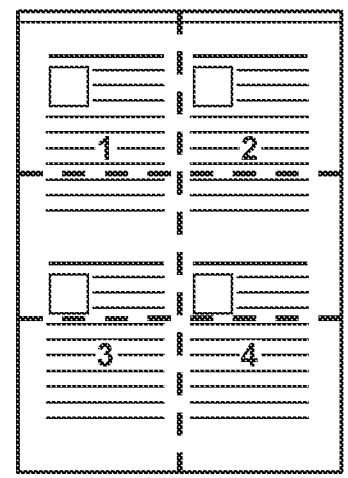
Figure 11E:
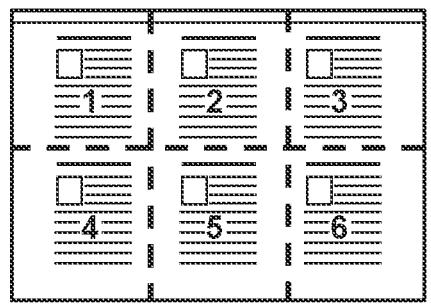
Figure 11F:
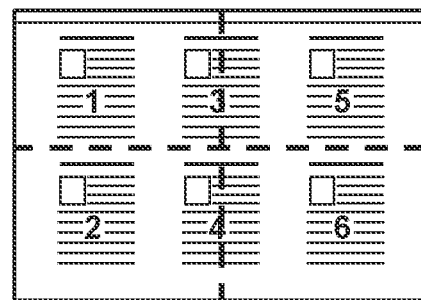

FIG. 11A illustrates an example of combining the perforation process at the center of the long sides of paper and the 2 in 1 print. Since a position of a perforation line does not overlap the logical pages, there is no problem with this combination. FIG. 11B illustrates an example of combining the perforation process in a cross shape so as to equally divide paper into four and the 2 in 1 print. Since positions of perforation lines overlap the logical pages, this combination is a target of the prohibition processing. FIG. 11C illustrates an example of combining the perforation process in the cross shape to divide paper into four and the 4 in 1 print. There is no problem with this combination. FIG. 11D illustrates an example of combining the perforation process of forming a total of three perforation lines at positions that equally divide the long sides of paper into three and at the center of short sides of paper, and the 4 in 1 print. Since positions of perforation lines overlap the logical pages, this combination is a target of the prohibition processing. FIG. 11E illustrates an example of combining the perforation process of forming a total of three perforation lines at positions that equally divide the long sides of paper into three and at the center of the short sides of paper, and the 6 in 1 print. There is no problem with this combination. FIG. 11F illustrates an example of combining the perforation process in the cross shape to divide paper into four and the 6 in 1 print. Since positions of perforation lines overlap the logical pages, this combination is a target of the prohibition processing.

While the present disclosure has been described together with the exemplary embodiments, the above-mentioned exemplary embodiments are merely specific examples of implementing the present disclosure, and the technical scope of the present disclosure should not be interpreted in a limited manner by the exemplary embodiments. That is, the present disclosure can be implemented in various manners without departing from the technical idea or the principal features of the present disclosure.

While the perforation process has been described in the above-mentioned exemplary embodiments, the present disclosure can also be similarly applied to a crease process. The crease process is based on the premise that a printed product is to be folded at a position of a crease. Thus, in a case where the N in 1 print is set together with the crease process, there is a case where the printed product is folded at an incorrect position. Similarly to the above-mentioned first exemplary embodiment, the prohibition processing is performed so as to avoid selection of predetermined numbers of aggregated pages in the page layout selection section 602 in FIG. 6, based on the number of creases selected in a crease process selection section (not illustrated) which is similar to the perforation process selection section 502 in FIG. 5. This can prevent output of a deliverable in which pages are printed on a crease. Furthermore, similarly to the above-described second exemplary embodiment, the prohibition processing is performed so as to avoid selection of predetermined layout orders in the layout order selection section 904 based on respective setting values selected in the crease process selection section (not illustrated), the page layout selection section 902, and the print orientation selection section 903. This can prevent inclusion of discontinuous pages in a plane formed when paper is folded.

OTHER EXEMPLARY EMBODIMENTS

The present disclosure can be implemented by installing a program that implements one or more functions of the above-mentioned exemplary embodiments in a system or an apparatus via a network or a storage medium, and one or more processors in the system or a computer of the apparatus loading and executing the program. Furthermore, the present disclosure can be implemented by a circuit (e.g., application specific integrated circuit (ASIC)) that implements one or more functions.

The present disclosure can improve a user's convenience when print with the perforation process or the crease process is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus, comprising:
a controller configured to:
receive selection of a first function for performing cutting on a center line of a sheet by a printer;
receive selection of a second function for layout of images corresponding to nine pages on one side of a sheet; and
inhibit selection of at least the second function in a case where the first function is selected.

2. A control method for an information processing apparatus, the control method comprising:
receiving selection of a first function for performing cutting on a center line of a sheet by a printer;
receiving selection of a second function for layout of images corresponding to nine pages on one side of a sheet; and
inhibiting selection of at least the second function in a case where the first function is selected.

3. The control method according to claim 2, wherein the center line of the sheet is a center position of long sides of the sheet.

4. The control method according to claim 2, wherein the selection of the second function is performed by selecting one option corresponding to the second function from a plurality of options.

5. The control method according to claim 2, wherein the cutting is perforating.

6. The control method according to claim 2, wherein the selection of the first function and the selection of the second function are received on a print setting screen.

7. The control method according to claim 6, wherein the selection of at least the second function is performing by graying out an object for selecting the second function on the print setting screen.

8. The control method according to claim 6, wherein the print setting screen is provided by a printer driver.

9. A control method for an information processing apparatus, the control method comprising:
receiving selection of a first function for performing cutting on a center line of a sheet by a printer;
receiving selection of a second function for layout of images corresponding to nine pages on one side of the sheet; and
performing a predetermined notification in a case where both of the first function and the second function are selected.

10. The control method according to claim 9, wherein the center line of the sheet is a center position of long sides of the sheet.

11. The control method according to claim 9, wherein the selection of the second function is performed by selecting one option corresponding to the second function from a plurality of options.

12. The control method according to claim 9, wherein the cutting is perforating.

13. The control method according to claim 9, wherein the selection of the first function and the selection of the second function are received on a print setting screen.

14. The control method according to claim 13, wherein the print setting screen is provided by a printer driver.

15. The control method according to claim 9, wherein the predetermined notification indicates information corresponding the second function.

16. A control method for an information processing apparatus, the control method comprising:
causing a display to perform display of a first object for receiving selection of a first function for performing cutting on a center line of a sheet by a printer;
causing the display to perform display of a second object for receiving selection of a second function for layout of images corresponding to nine pages on one side of a sheet; and
causing the display to perform display so that the second object is not selected in a case where the first object is selected.

17. The control method according to claim 16, wherein the center line on the sheet is a center position of long sides of the sheet.

18. The control method according to claim 16, wherein the selection of the second function is performed by selecting one option corresponding to the second function from a plurality of options.

19. The control method according to claim 16, wherein the cutting is perforating.

20. The control method according to claim 16, wherein the first object and the second object are displayed on a print setting screen.

21. The control method according to claim 20, wherein, in the causing the display to perform display so that the second object is not selected, the second object is grayed out on the print setting screen.

22. The control method according to claim 21, wherein the print setting screen is provided by a printer driver.

23. A non-transitory computer readable storage medium storing instructions that causes an information processing apparatus to perform a control method, the control method comprising:
receiving selection of a first function for performing cutting on a center line of a sheet by a printer;
receiving selection of a second function for layout of images corresponding to nine pages on one side of a sheet; and
inhibiting selection of at least the second function in a case where the first function is selected.

24. The non-transitory computer readable storage medium according to claim 23, wherein the center line of the sheet is a center position of long sides of the sheet.

25. The non-transitory computer readable storage medium according to claim 23, wherein the selection of the second function is performed by one option corresponding to the second function from a plurality of options.

26. The non-transitory computer readable storage medium according to claim 23, wherein the cutting is cutting the sheet by perforating the sheet.

27. The non-transitory computer readable storage medium according to claim 23, wherein the cutting is perforating.

28. The non-transitory computer readable storage medium according to claim 23, wherein the selection of the second function is inhibited by graying out an object for selecting the second function on a print setting screen.

29. The non-transitory computer readable storage medium according to claim 28, wherein the print setting screen is provided by a printer driver.

30. A non-transitory computer readable storage medium storing instructions that causes an information processing apparatus to perform a control method, the control method comprising:
receiving a first function for performing cutting on a center line of a sheet by a printer;
receiving a second function for layout of images corresponding to nine pages on one side of the sheet; and
performing a predetermined notification in a case where both of the first function and the second function are selected.

31. The non-transitory computer readable storage medium according to claim 30, wherein the center line of the sheet is a center position of long sides of the sheet.

32. The non-transitory computer readable storage medium according to claim 30, wherein the selection of the second function is performed by selecting one option corresponding to the second function from among a plurality of options.

33. The non-transitory computer readable storage medium according to claim 30, wherein the cutting is perforating.

34. The non-transitory computer readable storage medium according to claim 30, wherein the predetermined notification is performed by displaying information.

35. The non-transitory computer readable storage medium according to claim 34, wherein the information is displayed on a print setting screen.

36. The non-transitory computer readable storage medium according to claim 30, wherein the predetermined notification indicates information corresponding the second function.

37. A non-transitory computer readable storage medium storing instructions that causes an information processing apparatus to perform a control method comprising:
causing a display to perform display of a first object for receiving selection of a first function for performing cutting on a center line of a sheet by a printer;
causing the display to perform display of a second object for receiving a second function for layout of images corresponding to nine pages on one side of a sheet; and
causing the display to perform display so that the second object is not selected in a case where the first object is selected.

38. The non-transitory computer readable storage medium according to claim 37, wherein the center line on the sheet is a center position of long sides of the sheet.

39. The non-transitory computer readable storage medium according to claim 37, wherein the selection of the second function is performed by selecting one option corresponding to the second function from among a plurality of options.

40. The non-transitory computer readable storage medium according to claim 37, wherein the cutting is perforating.

41. The non-transitory computer readable storage medium according to claim 37, wherein the first object and the second object are displayed on a print setting screen.

42. The non-transitory computer readable storage medium according to claim 37, wherein, in the causing the display to perform display so that the second object is not selected, the second object is grayed out on a print setting screen.

43. The non-transitory computer readable storage medium according to claim 42, wherein the print setting screen is provided by a printer driver.

44. An information processing apparatus comprising:
a controller configured to:
receive selection of a first function for performing cutting on a center line of a sheet by a printer;
receive selection of a second function for layout of images corresponding to nine pages on one side of the sheet; and
perform a predetermined notification in a case where both of the first function and the second function are selected.

45. An information processing apparatus comprising:
a controller configured to:
cause a display to perform display of a first object for selecting a first function for performing cutting on a center line of a sheet by a printer;
cause the display to perform display of a second object for receiving selection of a second function for layout of images corresponding to nine pages on one side of a sheet; and
cause the display to perform display so that the second object is not selected in a case where the first object is selected.

* * * * *